United States Patent
Carson et al.

(10) Patent No.: US 7,739,708 B2
(45) Date of Patent: Jun. 15, 2010

(54) SYSTEM AND METHOD FOR REVENUE BASED ADVERTISEMENT PLACEMENT

(75) Inventors: Chad Carson, Cupertino, CA (US); David Cho-Lun Ku, Palo Alto, CA (US); Jan Pedersen, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 615 days.

(21) Appl. No.: 11/281,919

(22) Filed: Nov. 16, 2005

(65) Prior Publication Data
US 2007/0027744 A1 Feb. 1, 2007

Related U.S. Application Data

(60) Provisional application No. 60/703,904, filed on Jul. 29, 2005.

(51) Int. Cl.
*G06F 15/16* (2006.01)
(52) U.S. Cl. .......................... 725/36; 725/42
(58) Field of Classification Search .................. 725/36, 725/42, 44, 46, 47, 32; 705/14
See application file for complete search history.

(56) References Cited

U.S. PATENT DOCUMENTS

| | | | | |
|---|---|---|---|---|
| 6,560,578 | B2* | 5/2003 | Eldering | 705/14 |
| 2003/0144907 | A1* | 7/2003 | Cohen et al. | 705/14 |
| 2004/0044571 | A1* | 3/2004 | Bronnimann et al. | 705/14 |
| 2004/0131014 | A1* | 7/2004 | Thompson et al. | 370/230 |
| 2004/0133468 | A1* | 7/2004 | Varghese | 705/14 |
| 2006/0106931 | A1* | 5/2006 | Richoux | 709/226 |

* cited by examiner

*Primary Examiner*—Sam Bhattacharya
(74) *Attorney, Agent, or Firm*—Seth H. Ostrow, Esq.; Ostrow Kaufman & Frankl LLP

(57) ABSTRACT

The present invention is directed towards systems and methods for ranking one or more advertisements. The method of the present invention comprises retrieving a result set comprising one or more advertisements responsive to a request. A clickability score is calculated for the one or more advertisements comprising the result set. An expected revenue value is calculated for the one or more advertisements using the clickability scores of the one or more advertisements as well as an indication of revenue associated with the one or more advertisements. The one or more advertisements are ordered according to the expected revenue of the one or more advertisements.

20 Claims, 4 Drawing Sheets

SYSTEM AND METHOD FOR REVENUE BASED ADVERTISEMENT PLACEMENT

RELATED APPLICATIONS

This application claims priority to U.S. Provisional Patent Application Ser. No. 60/703,904, entitled "SYSTEM AND METHOD ALLOWING INFORMATION PROVIDER ACCESS TO A NETWORKED DATABASE SEARCH SYSTEM," filed on Jul. 29, 2005, the disclosure of which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The present invention generally provides methods and systems for facilitating the ranking and positioning of advertisements. More specifically, the present invention provides methods and systems that use combinations of analytics data, confidence scores, and expected revenue to determine an ordering or positioning of one or more advertisements in response to a given request received from a client device.

Advertisements are commonly used on the Internet to promote various products and services. Advertisements may comprise banner ads, links to web pages, images, video, text, etc. The various advertisements used to promote products on the Internet may be displayed according to a variety of formats, such as within a ranked result set in response to a search query, embedded in a web page, a pop-up, etc. The advertisements displayed to a user of a client device may be selected, redirecting a user to the advertiser's website providing information regarding the product or service advertised.

Client devices, communicatively coupled to a network such as the Internet, are able to access various websites that may display advertisements. For example, a user of a client device may submit a search query comprising one or more terms to a search engine, which causes the search engine to retrieve a result set comprising links to content and advertisements responsive to the search terms provided by a user. The search engine displays the result set to a user, who may then select or view items in the result set comprised of one or more advertisements.

While the Internet provides advertisers with the ability to reach a significant quantity of users, thereby increasing the likelihood that a given product or service is purchased by a user, Internet advertising further provides revenue to search engines that retrieve and display advertisements in response to various requests. A search engine may generate profit when a given advertisement in a result set is selected by a user or displayed to a user in response to a search query. For example, advertisers may pay a predetermined amount to have banners, images, or other advertisements displayed to users in response to a given search query ("impressions"). Search engines may also charge advertisers for each advertisement selected by a user or delivered to a user ("click through"). However, different advertisements may be more or less profitable for a search engine to display as the amount paid by each advertiser for displaying or having a user select an advertisement varies. Furthermore, an advertisement ranked and displayed first in a result set is more likely to be selected by a given user than an advertisement ranked second, third, etc. Therefore, advertisers often want their one or more advertisements displayed in positions that increase the likelihood that a given advertisement is selected.

A bidding marketplace may be used whereby advertisers may bid for the position or rank of a given advertisement in response to a given query. Current methods for selecting the position or rank of an advertisement using a bidding marketplace may select an advertisement with the greatest bid to appear first in a ranked list of advertisements or in a position most likely to be seen and selected by users. Such methods for selecting advertisements with the greatest bid are based upon the assumption that advertisements with the greatest bids will yield the greatest revenues for a search engine. However, while an advertisement with the greatest bid may generate the most profit when selected, an advertisement with a lower bid may generate more profit if the likelihood of users selecting the second advertisement is significantly greater.

In addition to ranking methods based upon bids associated with advertisements, result sets comprised of advertisements generated in response to a user's query may also be ranked according to an algorithm that determines the frequency with which a query term appears in a given web site. Such ordering methodologies, however, are tailored to provide users with results that are ordered according to their relevancy with respect to a given query. Such ordering methods order results, such as advertisements, in descending order with the result most closely related to a user's query ranked first. Ordering advertisements in a result set in descending order with respect to relevancy is based upon the assumption that an advertisement ranked first in a result set displayed to a user is more likely to be viewed or selected than an advertisement ranked second, third, etc. However, these methods fail to take into account the profit interests and needs of the search engine providing the result on behalf of an advertiser.

While the ranking of an advertisement in a ranked result set is often indicative of the likelihood that a given advertisement is selected, the advertisement's appeal to users of client devices may play an important role in generating revenue for a search engine. Advertisers may pay a search engine for each user that selects a given advertisement. Advertisements that are the most appealing and most relevant to a given user's query may often be the advertisements most frequently selected by users, thereby generating greater revenue for a search engine. As noted above, current methodologies for ordering advertisements in response to a request examine the relevancy of a given advertisement. While relevancy is often a factor in a user's selection of a given advertisement, the likelihood of a user selecting a given advertisement is also based upon the advertisement's appeal to users, which may be determined based upon previous users' interactions with the advertisement. Therefore, when determining an ordering for advertisements in response to a request, search engines may want to consider relevancy, appeal and revenue to increase the likelihood that the most relevant and profitable advertisements are displayed and selected by users.

Current methods and systems for ranking advertisements in a result set or positioning items in a given web page fail to take into account relevance, appeal and revenue generating potential of advertisements displayed in response to a search request. In order to overcome shortcomings associated with existing techniques for ranking or positioning one or more advertisements, embodiments of the present invention provide systems and methods for examining the relevancy, appeal, and revenue generating potential of one or more advertisements and ranking or positioning the one or more advertisements based upon the same.

SUMMARY OF THE INVENTION

The present invention is directed towards methods and systems for ranking one or more advertisements. According to one embodiment of the invention, a result set comprising one or more advertisements responsive to a request is retrieved. A clickability score is calculated for the one or more advertisements in the result set. The clickability score associated with the one or more advertisements and a revenue value associated with the one or more advertisements are used to calculate the expected revenue of the one or more advertisements in the result set. The advertisements in the result set are ordered by the expected revenue value associated with the one or more advertisements in the result set.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
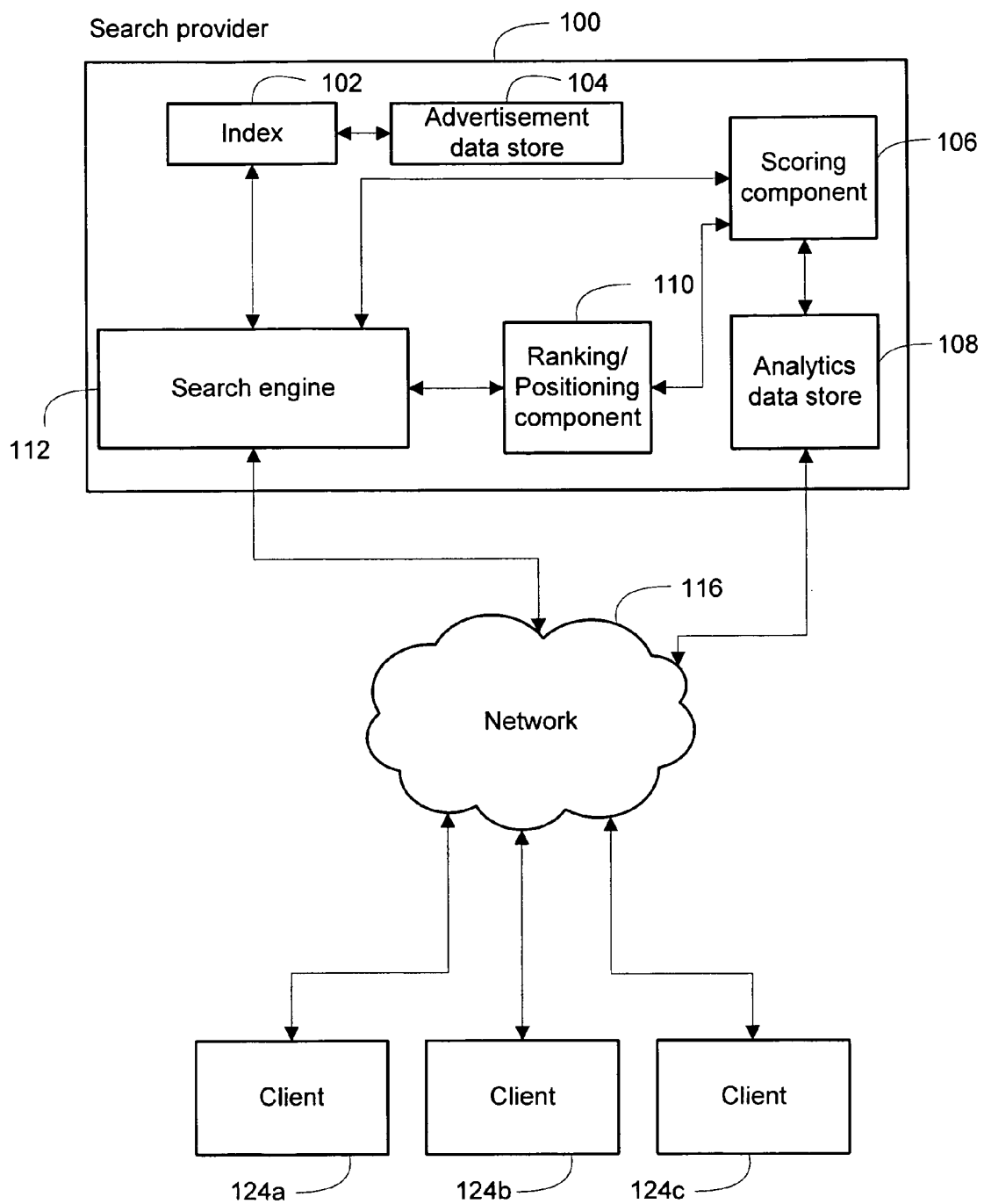
FIG. 1. is a block diagram presenting a system for retrieving and ranking one or more advertisements based upon a request received from a client device.

FIG. 1 presents a block diagram illustrating one embodiment of a system for retrieving and ordering advertisements. According to the system of FIG. 1, a search provider 100 comprises one or more software and hardware components to facilitate retrieving and ordering advertisements including, but not limited to, an index component 102, an advertisement data store 104, a scoring component 106, a search engine 112, a ranking/positioning component 110 and an analytics data store 108. The search provider 100 is communicatively coupled to a network 116, which may include a connection to one or more local and/or wide area networks, such as the Internet.

According to one embodiment of the invention, a search engine 112 receives search requests from client devices 124a, 124b and 124c communicatively coupled to the network 116. A client device 124a, 124b and 124c may be any device that allows for the transmission of search requests to the search provider 100, as well as receipt of a ranked result set of advertisements from the search provider 100. According to one embodiment of the invention, a client device 124a, 124b and 124c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 124a, 124b and 124c typically runs software applications such as a web browser that provide for transmission of search requests, as well as receipt and display of ranked result sets which may comprise of one or more advertisements.

The search engine 112 receives a search request from a given client device 124a, 124b and 124c, and investigates the index 102 to identify one or more advertisements responsive to the search request. The search engine 112 retrieves one or more advertisements from the advertisement data store 104 on the basis of the investigation of the index 102. The one or more advertisements retrieved from the advertisement data store 104 may be retrieved based on one or more match types. For example, advertisements constituting exact matches may be retrieved, where an exact match may comprise an advertisement wherein the advertisement contains all of the terms of a given search query received from a client device 124a, 124b and 124c. Similarly, advertisements constituting a broad match may be retrieved, where a broad match comprises an advertisement wherein at least one of the search terms of a given query appear in the advertisement. According to another embodiment of the invention, one or more categories of advertisements may be retrieved in response to the request. For example, a category may comprise one or more advertisements related to a given product or service.

The search engine 112 generates a result set that comprises one or more advertisements or links to advertisements that fall within the scope of the search request. Advertisements may comprise banner ads, text, audio files, video files, etc., selectable by a user of a client device 124a, 124b and 124c. Advertisements may also comprise links to advertisements that may be selected by a given user of a client device 124a, 124b and 124c.

The result set comprising the advertisements retrieved from the advertisement data store 104 is delivered to the scoring component 106. The scoring component 106 may calculate a relevance score for each advertisement comprising the result set. According to one embodiment of the invention, a relevance score comprises an indication of the relatedness of the one or more terms comprising an advertisement and the one or more terms comprising a given search query. For example, an advertisement retrieved from the advertisement data store may comprise content as well as one or more items identifying the advertisement, such as title, topic, category, etc. A relevance score may calculate how closely a given advertisement's title, topic, category, etc., as well as content, relate to a given query. A relevance score may be calculated for the one or more advertisements comprising the result set.

The one or more items comprising the result set may be given an additional relevance confidence score that may indicate the reliability of the calculated relevance score. More specifically, the relevance confidence score provides an indication of the extent to which a given advertisement matches a given query and the reliability of the given advertisement. According to one embodiment of the invention, relevance confidence scores are based upon the advertiser providing a given advertisement. For example, the relevance confidence score associated with an advertisement received from The U.S. Navy constituting an exact match with a given query may be increased, as the advertiser (The Navy) is a well-known source. Alternatively, the relevance confidence score associated with an advertisement for a small business that is not well known may be decreased, even though the advertisement may be an exact match with a given query. According to another embodiment of the invention, relevance confidence scores may be based upon the type of match. For example, the relevance confidence score associated with an advertisement constituting an exact match may be increased, while the relevance confidence score associated with a broad match may be decreased. According to another embodiment of the invention, relevance confidence scores may be based upon an examination of an index identifying unreliable sources. For example, an index may be maintained identifying URLs that direct users to questionable or unreliable content, thereby resulting in a decreased relevance confidence score. Relevance confidence scores, according to one embodiment of the invention, are based upon a scale from zero to one.

Click through data regarding served advertisements is retrieved and stored in the analytics data store 108, which is communicatively coupled to the network 116. The analytics data store 108 is operative to receive data indicating that a given advertisement was selected by a user of a client device 124a, 124b and 124c. The analytics data store 108 may further maintain data indicating the time a given advertisement was selected, user characteristics of a user who selected a given advertisement, as well as the position of an advertisement when displayed and selected by a user of a client device 124a, 124b and 124c.

The scoring component 106 is further operative to use the click through data stored in the analytics data store 108 to calculate a normalized estimate of the click through rate of the one or more advertisements comprising the result set. A normalized click through rate provides an indication of the likelihood of a user selecting a given advertisement based upon the past behavior of one or more users with respect to the given advertisement. The analytics data store, which maintains click through data for the one or more advertisements comprising the result set, provides click through data to the scoring component 106. The scoring component 106 uses the data received from the analytics data store 108 to calculate a normalized click through rate for the one or more advertisements comprising the result set.

According to one embodiment of the invention, a normalized click through rate is calculated to normalize differences in click through rates due to advertisements appearing in different positions within a ranked result set. Because advertisements appearing first in a ranked result set may be more likely to be selected by a user than advertisements appearing second, third, etc., an advertisement appearing first in a ranked result set may have a significantly greater click through rate than an advertisement appearing second, third, etc. A normalization of the click through rates may be performed to compensate for the difference in rank positions of the one or more items comprising a group of advertisements. Reference data may be used by the respective normalizing algorithm to provide information specifying the likelihood of an advertisement being selected by a user when displayed in position one, two, three, etc., of a ranked group of advertisements.

According to another embodiment of the invention, a normalized click through rate is calculated to normalize differences in click through rates due to advertisements appearing at different times of the day, different days of the week, etc. For example, advertisements appearing at 9:00 a.m. or 7:00 p.m. may receive a greater click through rate than advertisements appearing at 4:30 a.m. or 11:00 p.m. Advertisements appearing during different time periods may be normalized in order to compare the effectiveness of one or more advertisements. According to yet another embodiment of the invention, a normalized click through rate is calculated using multiple factors. For example, normalization may be performed for click through rates associated with a certain time of day in conjunction with click through rates associated with certain user characteristics as specified in a user profile.

The scoring component 106 is further operative to calculate a click through rate confidence score corresponding to the normalized click through rate associated with the one or more advertisements comprising the result set. The click through rate confidence score corresponding to the normalized click through rate associated with the one or more advertisements comprising the result set comprises an indication of the reliability of the click through data. For example, the normalized click through rate calculated by the scoring component 106 may be discounted due to one or more factors. According to one embodiment of the invention, a click through rate confidence score is based upon the quantity of data maintained by the analytics data store. For example, if the quantity of data gathered by the analytics data store for a given advertisement 108 is below a given threshold, the click through data may not provide a reliable indication of the frequency with which an advertisement is selected, thereby resulting in a decreased click through rate confidence score. Alternatively, if the quantity of data gathered by the analytics data store exceeds a given threshold, the normalized click through rate may provide a strong indication of the likelihood of another user selecting a given advertisement, thereby resulting in an increased click through rate confidence score.

According to another embodiment of the invention, the click through rate confidence score is based upon a determination of whether a given advertisement has been updated or replaced with an alternate advertisement. For example, an advertisement may be displayed to users for a period of six months. During the time the advertisement is displayed, data indicating user interactions with the advertisement is maintained at the analytics data store 108. If the advertisement is replaced or updated, the accuracy of the historical click through data must be discounted, as it does not directly correspond to the new advertisement. According to one embodiment of the invention, the click through rate confidence score is based upon a comparison between an old advertisement and a new advertisement. For example, if the difference between an old advertisement and a new advertisement is minimal, the click through rate confidence score associated with the click through rate may be increased. Alternatively, if the difference between an old advertisement and a new advertisement is significant, the click through rate confidence score associated with the normalized click through rate may be decreased. The difference between an old advertisement and a new advertisement may be measured using a clickability score, which is calculated according to the methods described herein.

The relevance score, relevance confidence score, normalized click through rate and the click through rate confidence score are combined to calculate a clickability score, which may comprise a prediction of the click through rate of a given advertisement in response to a given query. According to one embodiment of the invention, the scoring component is operative to use the appropriate combination of relevance scores and click through rates as determined by the amount or significance of click through data available. For example, if the quantity of click through data associated with a given advertisement is minimal, the scoring component may give greater weight to the relevance score and relevance confidence score. Alternatively, if the quantity of click through data associated with a given advertisement is significant, the scoring component may give greater weight to the click through rate and click through rate confidence score.

The clickability score is used in conjunction with the bid price associated with a given advertisement in response to a given query. According to one embodiment of the invention, the one or more advertisements comprising the result set have associated price per click bids that may be stored in the advertisement data store 104. The bids associated with the one or more advertisements comprise the amount of money an advertiser is willing to pay for each user that selects one of the advertiser's advertisements. The scoring component 106 is operative to combine the clickability score and the price per click bids associated with the one or more advertisements to compute the expected revenue for a given advertisement in the result set.

The expected revenue associated with the one or more advertisements comprising the result set may be utilized by the ranking/positioning component 110 to order the one or more advertisements. The ranking/positioning component 110 is operative to receive one or more advertisements and order the advertisements based upon the one or more advertisements' associated expected revenue scores. According to one embodiment of the invention, the ranking/positioning component 110 orders the one or more advertisements by expected revenue in descending order.

The ranking/positioning component 110 may be further operative to calculate the price to charge a given advertiser based upon the position of an advertisement in a ranked list of advertisements and a given advertiser's price per click bid. As previously noted, a price per click bid may be associated with a given advertisement comprising the result set. The ranking/positioning component 110 traverses the ordered result set and determines the minimum price per click that a given advertiser must pay in order to maintain the ranking of a given advertisement in the ordered result set. The price determined by the ranking/positioning component 110 may be stored in the advertisement data store 104 with an associated advertisement. The ranking/positioning component 110 delivers the ordered advertisements to the search engine 112, which may display the ordered advertisements to client devices 124*a*, 124*b* and 124*c* that initiated the search query. Users of client devices 124*a*, 124*b* and 124 may select one or more of the advertisements displayed. User interactions with the displayed advertisements are delivered to the analytics data store 108.

The system of the present invention may also be used to determine the positioning of one or more advertisements in a given web page. Users of client devices 124*a*, 124*b* and 124*c* communicatively coupled to a network 116 may access various web pages. For example, a user may submit a search query to a search engine and receive one or more links to web pages responsive to the user's search query. When a user selects a link, the user may be redirected to a web page. The web page displayed to a user may be comprised of both content responsive to the user's search query as well as one or more advertisements.

The position of a given advertisement in a web page may affect the likelihood that a given user viewing the web page will select the advertisement. For example, a web page displayed to a user may contain several items of content and advertisements that require a user to navigate to the bottom of the web page in order to view all the content and advertisements comprising the web page. A user who fails to navigate to the bottom of the web page may never see, and thereby never select, advertisements displayed on the bottom of the web page. Therefore, a search engine may want to display the advertisements that generate the greatest revenue and that are the most likely to be selected in the one or more areas of a web page that are most frequently seen by users of client devices viewing a web page. The system of the present invention may further be used to determine the positioning of one or more advertisements retrieved from the advertisement data store 104. The ranking/positioning component 110 is operative to utilize the expected revenue scores associated with the one or more advertisements comprising the result set and determine a position for the one or more advertisements on a given web page.

Figure 2:
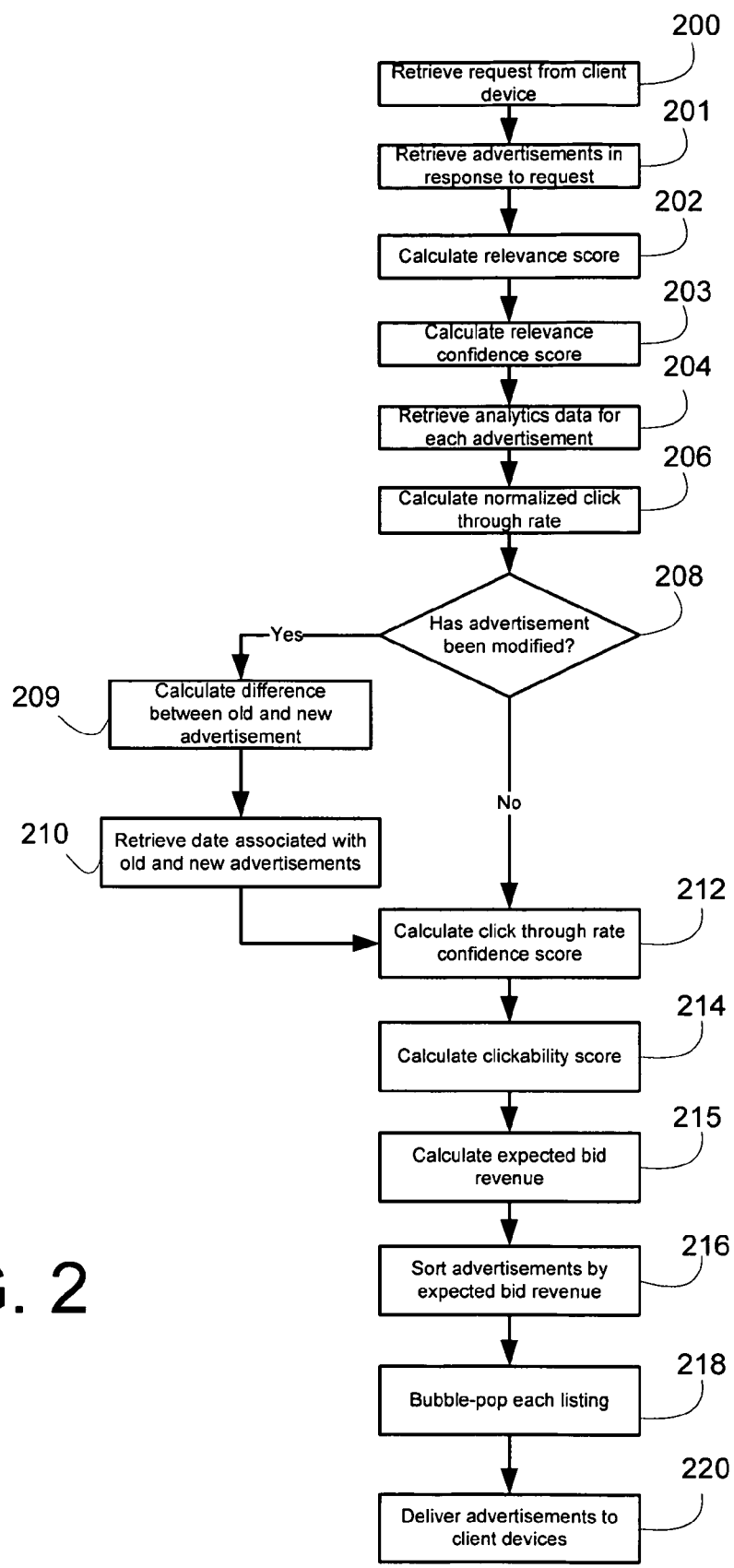
FIG. 2 is a flow diagram presenting a method for retrieving and ordering one or more advertisements based upon expected revenue in response to a request and delivering the one or more advertisements to client devices.

FIG. 2 presents a flow diagram illustrating one embodiment of a method for ordering advertisements based upon expected revenue. A search engine receives a request from a client device, step 200. According to one embodiment of the invention, a request comprises a search query made up of one or more terms. The search engine uses the request to retrieve one or more advertisements stored in an advertisement data store, step 201. Advertisements retrieved in response to the request received from a client device may be retrieved according to one or more matching methods. According to one embodiment of the invention, advertisements constituting an exact match are retrieved from the advertisement data store. An exact match may comprise an advertisement that contains all of the terms of a given query. According to another embodiment of the invention, advertisements constituting an advanced match are retrieved from the advertisement data store. An advanced match may comprise an advertisement wherein the advertisement's title, category information, and topic all correspond to the query received. Those of skill in the art recognize additional methods for matching and retrieving advertisements in response to a given search query may be utilized.

A result set is generated comprising the one or more advertisements retrieved from the advertisement data store, step 201. A relevance score is calculated for the one or more advertisements comprising the result set, step 202. According to one embodiment of the invention, a relevance score comprises an indication of how relevant a given advertisement is to the one or more terms comprising a given search query. For example, an advertisement retrieved from the analytics data store may comprise content as well as one or more items identifying the advertisement, such as title, topic, category, etc. A relevance score may calculate how closely a given advertisement's title, topic, category, etc., as well as content, relate to a given query.

A relevance confidence score is calculated corresponding to the relevance score for the one or more advertisements comprising the result set. The relevance confidence score may provide an indication of the extent to which a given advertisement matches a given query as well as the reliability of the given advertisement. According to one embodiment of the invention, relevance confidence scores are based upon the advertiser providing a given advertisement. For example, if an advertisement was received from a reputable source, the relevance confidence score associated with the given advertisement may be increased. Alternatively, if an advertisement was received from an unknown business, the relevance confidence score associated with the advertisement may be decreased. According to another embodiment of the invention, relevance confidence scores may be based upon the type of match that resulted in a given advertisement's inclusion in the result set. For example, the relevance confidence score associated with an advertisement constituting an exact match may be increased, whereas the relevance score associated with an advertisement constituting an advanced match may be decreased. According to another embodiment of the invention, relevance confidence scores may be assigned or modified based upon an examination of an index identifying unreliable sources. For example, an index may be maintained identifying advertisement URLs that direct users to questionable or unreliable content, thereby resulting in a decreased relevance confidence score. Relevance confidence scores are assigned to the one or more relevance scores associated with the one or more advertisements comprising the result set.

Analytics data is retrieved to calculate a normalized click through rate, step 204. According to one embodiment of the invention, an analytics data store maintains data identifying user interactions with a given advertisement. For example, the analytics data store may maintain data identifying how many times a given advertisement was selected, the type of users that selected a given advertisement, the time of day an advertisement was selected, the position of an advertisement in a ranked list when selected, how often an advertisement was displayed, etc. The analytics data retrieved from the analytics data store is used to calculate a normalized click through rate, step 206. A normalized click through rate allows for an effective comparison of one or more advertisements displayed at different times of the day, different positions in a ranked list, etc. According to one embodiment of the invention, normalized click through rates are calculated by determining the ratio of the number of times a given advertisement was selected at a given position in a ranked list and the number of times it was expected that a given advertisement would be selected when displayed in a given position in ranked list. Reference data may be used to provide information indicating the expected number of selections a given advertisement should receive when displayed in a given position.

Table A presents an equation illustrating one embodiment for computing the expected click-through rate for a given advertisement displayed in a given position in a ranked list of advertisements:

TABLE A $$\text{expected clicks} = \sum_{r=1}^{n} ctr_r * imps_r$$

In the equation presented in Table A, $ctr_r$ is the reference click through rate for a given rank r and $imps_r$ is the number of times a given advertisement was displayed at a given rank. According to one embodiment of the invention, the number of times an advertisement was selected is divided by the expected number of selections for a given advertisement to compute the normalized click through rate. A normalized click through rate is calculated for the one or more advertisements comprising the result set, step 206.

The result set is traversed and a check is performed to determine whether an advertiser has changed or modified any of the one or more advertisements comprising the result set, step 208. If it is determined that an advertisement has been changed or modified, the extent of change between the old advertisement and new advertisement is calculated, step 209. According to one embodiment of the invention, a clickability score (calculated according to methods described herein) may be associated with each advertisement stored in the advertisement data store and may provide a prediction of the probability that a given user will select a given advertisement. A clickability score may be used to compare the change between an old advertisement and a new advertisement. According to one embodiment of the invention, a clickability score is a value from zero to one.

A date associated with each version of a modified advertisement is retrieved, step 210. The date associated with a modified advertisement allows the scoring component to associate click through data with the proper version of an advertisement. For example, if an initial version of an advertisement has an associated date of "Jun. 1, 2004" and an updated version of the advertisement has an associated date of "Dec. 1, 2004," the scoring component may determine that click through data for the period of Jun. 1, 2004 to Nov. 30, 2004 corresponds to the initial version of the advertisement. The scoring component may further determine that click through data from Dec. 1, 2004 onward is associated with the updated version of the given advertisement. Thus, the date associated with a given advertisement allows the scoring component to ascertain the version of an advertisement associated with a given period of click through data retrieved from the analytics data store.

The normalized click through data associated with a given advertisement is used to calculate a click through rate confidence score, step 212. According to one embodiment of the invention, a click through rate confidence score is based upon the quantity of data gathered by the analytics data store. For example, if the quantity of data gathered by the analytics data store for a given advertisement is minimal, the click through data may not provide a reliable indication of the frequency with which an advertisement is selected, thereby resulting in a decreased click through rate confidence score. Alternatively, if the quantity of data gathered by the analytics data store is significant, the normalized click through rate may provide a strong indication of the likelihood that a given user will select a given advertisement.

If an advertisement has been modified, the date and difference in clickability score are used to calculate a click through rate confidence score associated with the normalized click through rate for a given advertisement, step 212. For example, if a given advertisement has been changed significantly, click through data corresponding to the old version of the advertisement may fail to provide an adequate indication of the click through rate for the new version of the advertisement. Thus, the click through data corresponding to the old version of the advertisement may be given less weight when calculating the click through rate confidence score, while click through data for the new version will be given greater weight in calculating the click through rate confidence score.

In addition to the foregoing, if a given advertisement has been changed minimally, click through data corresponding to the old version of the advertisement may provide an indication of the click through rate for the new version of the advertisement, as the small change may not affect performance of the advertisement significantly. Thus, if the difference in clickability score is a value near one, thereby indicating that the difference between an old advertisement and new advertisement is significant, less weight may be given to the click through data associated with the old advertisement. Alternatively, if the difference in clickability score is a value near zero, thereby indicating that the difference between an old advertisement and a new advertisement is minimal, greater weight may be given to the normalized click through data for the old version of the advertisement when calculating a click through rate confidence score.

The relevance score, relevance confidence score, click through rate and click through rate confidence score are combined to calculate a clickability score for the one or more advertisements comprising the result set, 214. A clickability score provides an indication of the likelihood that a given user will select a given advertisement in response to a given query. According to one embodiment of the invention, the clickability score is calculated using the appropriate combination of relevance scores and click through rates as determined by the amount or significance of click through data available. For example, if the quantity of click through data associated with a given advertisement is minimal, greater weight may be given to the relevance score and relevance confidence score. Alternatively, if the quantity of click through data associated with a given advertisement is significant, greater weight may be given to the click through rate and click through rate confidence score.

The clickability score is used to calculate the expected bid revenue of each advertisement comprising the result set, step 215. The expected bid revenue of a given advertisement provides an indication of the revenue a search engine may receive from a given advertiser if a given advertisement is displayed in a given position of a ranked list of advertisements. Associated with the one or more advertisements retrieved from the advertisement data store is a value indicating an advertiser's bid for displaying an advertisement in a given position in a ranked list of advertisements. For example, an advertiser may provide a bid for displaying a given advertisement in a given position in a ranked list of advertisements in response to a given query. In a bidding marketplace for advertisements, a bid associated with a given advertisement indicates the maximum amount of money an advertiser is willing to pay to display an advertisement in a given position in a ranked list of advertisements in response to a given query.

The product of the clickability score for a given advertisement and the bid associated for displaying a given advertisement in a given position in response to a given query provide the expected bid revenue of a given advertisement. The one or more advertisements comprising the result set may be ordered by each advertisement's associated expected bid revenue value, step 216. Table B illustrates one embodiment of an equation for computing the expected bid revenue of one or more advertisements comprising a result set:

TABLE B $$Rev = \sum_{k=1}^{P} CLKB(Q, L_k) \cdot bid(Q, L_k)$$

In the equation presented in Table B, $CLKB(Q,L_k)$ is the clickability of $(Q,L_k)$, where Q is a given query, $L_k$ is an advertisement served in position k of a ranked list of advertisements in response to query Q, $bid(Q,L_k)$ is the bid price a given advertiser is willing to pay to have an advertisement L displayed in position k in response to query Q, and P is the number of advertisements comprising a result set.

Though a bid provides a maximum value a given advertiser is willing to pay, in a bidding marketplace a bid may not necessarily be the amount of money an advertiser actually pays for having an advertisement displayed in a given position. For example, in a bidding marketplace where advertisers are unaware of other advertisers' bids, an advertiser's bid may represent the maximum value an advertiser is willing to pay for a given advertisement to be displayed in a given position. A first advertiser may bid $1.25 to have an advertisement displayed in response to a given query, and a second advertiser may bid $1.50 to have an advertisement displayed in response to the same query. The actual price charged to the second advertiser may be $1.26, as this represents the minimum bid necessary for the second advertiser to exceed the first advertiser's bid and maintain a given position in a ranked listing of advertisements. Because an advertiser may only be charged the price needed to exceed a lower bid, the actual amount of money a given advertiser pays is needed in order to calculate the expected revenue of a given advertisement.

To compute the expected revenue of a given advertisement, a bubble popping algorithm may be used to determine the actual price a given advertiser will pay to maintain a given position for a given advertisement displayed in a ranked list of advertisements, step 218. The result set, ordered by expected bid revenue, is delivered to client devices, step 220. The result set is displayed as a ranked list of advertisements. A user of a client device may select one or more of the given advertisements displayed to the user.

Figure 3:
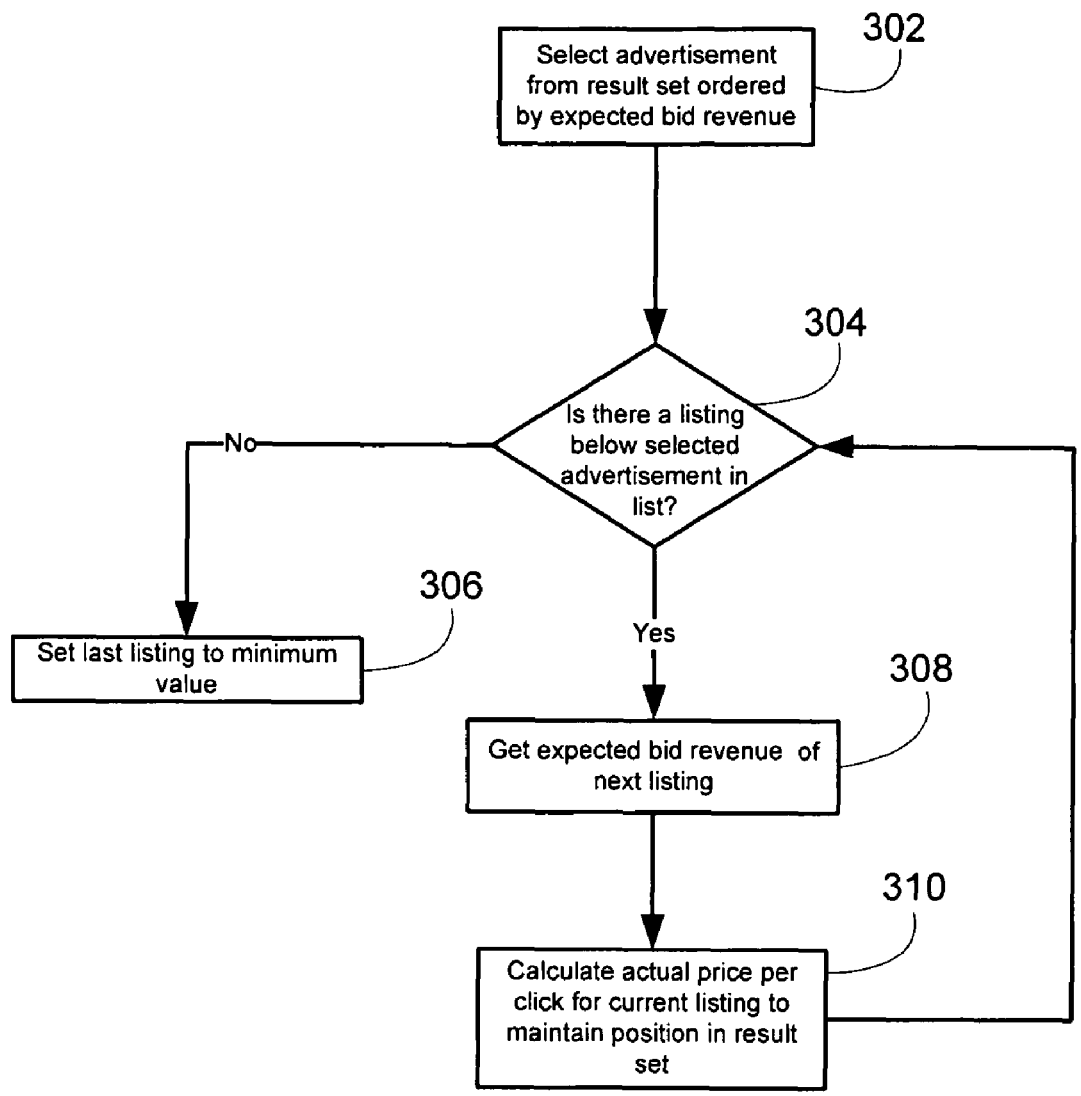
FIG. 3 is a flow diagram presenting a method for calculating the price charged to an advertiser in a bidding marketplace.

As described above, a bubble popping algorithm may be used to calculate the expected revenue of one or more advertisements comprising a result set. FIG. 3 presents a flow diagram illustrating one embodiment of a method for using a bubble popping algorithm to calculate the actual price paid by a given advertiser in a bidding marketplace when an advertiser's advertisement is displayed in a given position in a ranked list of advertisements in response to a given query.

A first advertisement is selected from a result set ordered by expected bid revenue, step 302. Additionally, the result set is traversed to select a second advertisement from the result set, step 304. According to one embodiment of the invention, the second advertisement selected comprises an advertisement ranked subsequent to the first advertisement selected. The expected bid revenue associated with the second advertisement, which may be calculated in accordance with the equation illustrated in Table B, is retrieved, step 308. The expected bid revenue is used to calculate the actual price charged for the first advertisement in order for the first advertisement to maintain its position in the result set ordered by expected bid revenue, step 310. The expected bid revenue of a given advertisement may comprise the product of a given advertisement's clickability score and associated bid. The bid associated with a given advertisement is decreased to the minimal value needed in order for the advertisement's expected revenue to exceed a subsequently ranked advertisement's expected bid revenue. If a second advertisement is not found that is ranked consecutively after the advertisement selected, the selected advertisement comprises the last advertisement in the result set. The last advertisement is assigned an actual price value that results in the last advertisement having an expected revenue value below all other expected revenue values associated with the one or more items comprising the result set, step 306. Table C presents an equation illustrating one embodiment for computing the actual price of a given advertisement based upon the expected bid revenue of a subsequent advertisement in a result set ordered by expected bid revenue.

TABLE C $$paid(Q, L_k) = \frac{CLKB(Q, L_{k+1})}{CLKB(Q, L_k)} \cdot bid(Q, L_{k+1}) + \$0.01$$

In the equation presented in Table C, $CLKB(Q,L_k)$ is the clickability of $(Q,L_k)$, where Q is a given query, $L_k$ is an advertisement served in position k of a ranked list of advertisements in response to query Q, $bid(Q,L_k)$ is the bid price a given advertiser is willing to pay to have an advertisement L displayed in position k in response to query Q, $paid(Q,L_k)$ is the actual price paid by a given advertiser when an advertisement L is displayed in position k in response to query Q.

The actual price computed for the one or more advertisements comprising the result set may be used to calculate the expected revenue of the one or more advertisements. Table D presents an equation demonstrating one embodiment for computing the expected revenue of one or more advertisements comprising a result set:

TABLE D $$Rev = \sum_{k=1}^{P} CLKB(Q, L_k) \cdot paid(Q, L_k)$$

In the equation presented in Table D, $CLKB(Q,L_k)$ is the clickability of $(Q,L_k)$, where Q is a given query, $L_k$ is an advertisement served in position k of a ranked list of advertisements in response to query Q, $paid(Q,L_k)$ is the actual price paid by a given advertiser when an advertisement L displayed in position k in response to query Q, and P is the number of advertisements comprising a result set.

Figure 4:
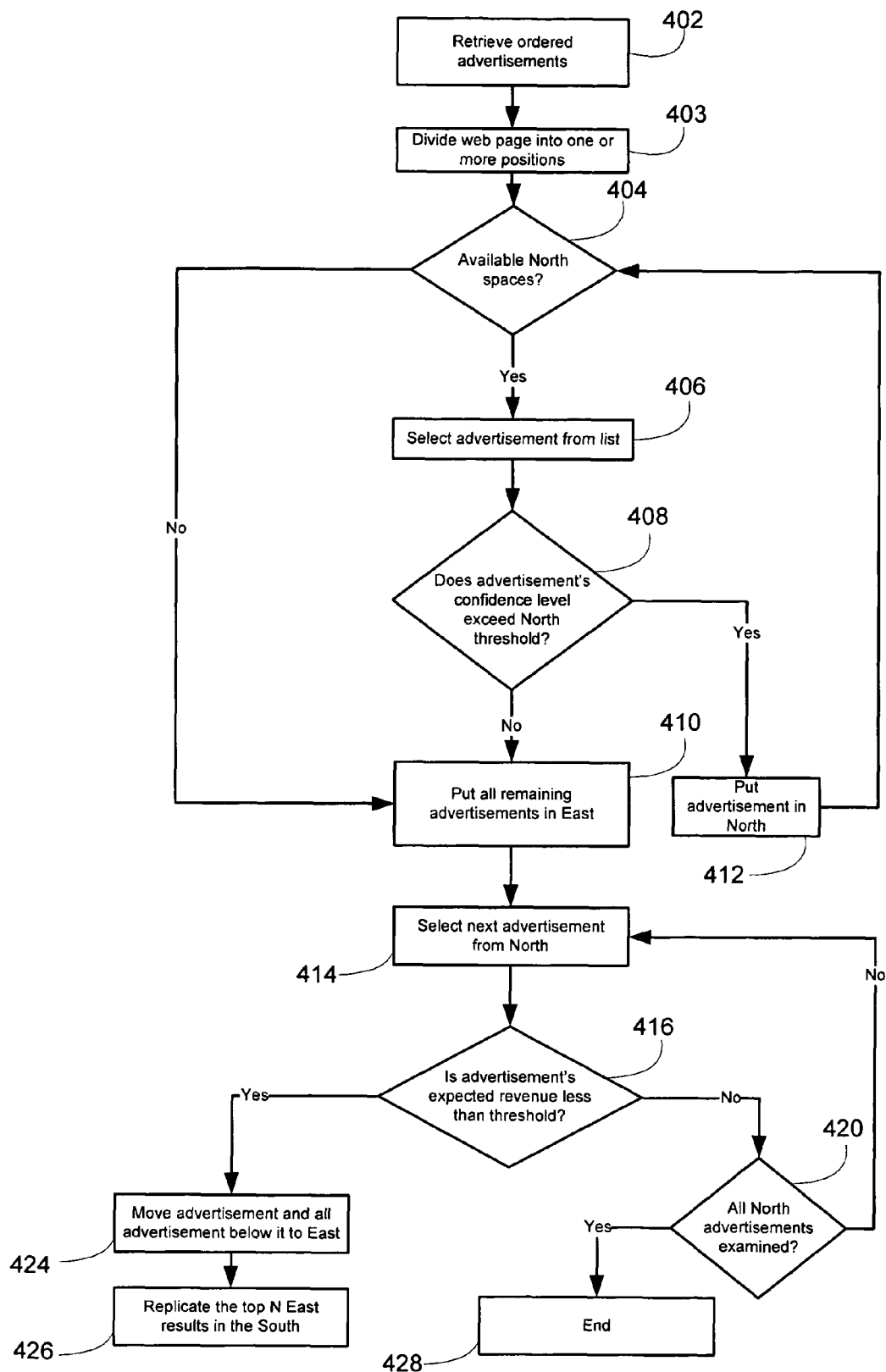
FIG. 4 is a flow diagram presenting a method for selecting the positioning of one or more advertisements in a given web page.

As discussed above, embodiments of the present invention may determine the positioning of one or more advertisement in a given web page. FIG. 4 presents a flow diagram illustrating one embodiment of a method for determining the location of one or more advertisements in a given web page displayed to a user of a client device. A result set is retrieved comprising one or more advertisements ordered by expected revenue, step 402. A web page is divided into one or more locations at which one or more advertisements from the result set may be displayed, step 403. According to one embodiment of the invention, a web page is divided into a North position, South position and East position. A check is performed to determine whether any space is available in the North position of a given web page for displaying a given advertisement from the result set, step 404. If space is available in the North position of the given web page, the ordered result set is traversed and an advertisement is selected, step 406. The click through rate confidence score associated with a given advertisement's click through rate is retrieved, which provides an indication of the likelihood that a user will select the given advertisement. If the click through rate confidence score associated with the advertisement selected exceeds a predetermined confidence threshold, step 408, the advertisement is placed in the North position of the given web page, step 412. If there is no available space in the North position, step 404, or if a given advertisement's click through rate confidence score does not exceed the confidence threshold, step 408, the advertisement selected, and the one or more advertisements comprising the result set ranked below the selected advertisement, are placed in the East position of the web page, step 410.

An advertisement is selected from the one or more advertisements placed in the North position, step 414. The selected advertisement's associated expected revenue is compared with an expected revenue threshold, step 416. If the expected revenue threshold is greater than an advertisement's associated expected revenue, the advertisement selected, and the one or more advertisements placed in the North position ranked below the given advertisement, are moved to the East position, step 424. The top N ranked advertisements in the East position are replicated and moved to the South position, step 426. Alternatively, if the advertisement's expected revenue exceeds the expected revenue threshold, step 416, a check is performed to determine whether all advertisements placed in the North position have been examined, step 420. If all of the one or more advertisements placed in the North position have been examined, processing terminates, step 428. If all advertisements have not been examined, step 420, a next advertisement is selected, step 414. The resulting web page displays advertisements that generate the greatest revenue and have the greatest likelihood of being selected in locations where they are most likely to be viewed and selected. Those of skill in the art recognize that the method illustrated in FIG. 4 may be used to place advertisements in any of the one or more locations of a given web page.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium," "computer readable medium" and "computer usable medium" are used to generally refer to media such as a random access memory (RAM); a read only memory (ROM); a removable storage unit (e.g., a magnetic or optical disc, flash memory device, or the like); a hard disk; or the like.

While the invention has been described and illustrated in connection with preferred embodiments, many variations and modifications as will be evident to those skilled in the art may be made without departing from the spirit and scope of the invention, and the invention is thus not to be limited to the precise details of methodology or construction set forth above as such variations and modifications are intended to be included within the scope of the invention.

We claim:

1. A method for ranking one or more advertisements, the method comprising:

receiving a search request including one or more search terms;

retrieving a result set comprising one or more advertisements responsive to the search request;

for the one or more advertisements comprising the result the set, calculating a clickability score;

for the one or more advertisements, calculating an expected revenue for a given advertisement using the clickability score the given advertisement and an indication of revenue associated with the given advertisement the indication of revenue including an expected bid revenue;

ordering the one or more advertisements according to the expected revenue of the one or more advertisements; and computing an actual price value for at least one of the advertisements using a bubble popping algorithm, the actual price being a price a given advertiser will pay to maintain a given position in the ordering of the one or more advertisements for the at least one of the advertisements in the result set.

2. The method of claim 1 further comprising:
calculating a relevance score for each of the advertisements, the relevance score indicating a relatedness of the one or more search terms to each of the advertisements.

3. The method of claim 2 further comprising:
calculating a relevance confidence score that indicates a reliability of the relevance score.

4. The method of claim 3 wherein the calculating the relevance confidence score includes at least one of:
increasing the relevance confidence score for an exact match between the advertisement and the search request; and
decreasing the relevance confidence score for a broad match between the advertisement and the search request.

5. The method of claim 3 wherein the calculating the relevance confidence score is based upon an examination of an index identifying unreliable sources.

6. The method of claim 1 further comprising:
retrieving click through data regarding, when available, each of the advertisements comprising the result set; and
calculating a normalized click through rate for each advertisement, the normalized click through rate providing an indication of a likelihood of a user selecting a given advertisement based upon past behavior.

7. The method of 6 wherein the normalized click through rate accounts for at least one of: advertisements appearing in different places within a ranked result set, a day of the week for the placement of the advertisements and a time of day for the placement of advertisements.

8. The method of claim 6 further comprising:
calculating a click through rate confidence score based on the normalized click through rate for each advertisement.

9. The method of claim 8 wherein the click through rate confidence score is adjusted by at least one of the following: a quantity of data maintained by an analytics data store, a determination of whether a given advertisement has been updated or replaced with an alternative advertisement.

10. The method of claim 1 wherein the clickability score is calculated based on all of a relevance score, a relevance confidence score, a normalized click through rate and a click through rate confidence score.

11. A system for ranking one or more advertisements, the system comprising:
a computer readable medium having executable instructions thereon; and
a processing device, in response to the executable instructions, operative to:
receive a search request including one or more search terms;
retrieve a result set comprising one or more advertisements responsive to the search request;
for the one or more advertisements comprising the result the set, calculate a clickability score;
for the one or more advertisements, calculate an expected revenue for a given advertisement using the clickability score the given advertisement and an indication of revenue associated with the given advertisement the indication of revenue including an expected bid revenue;
order the one or more advertisements according to the expected revenue of the one or more advertisements; and
compute an actual price value for at least one of the advertisements using a bubble popping algorithm, the actual price being a price a given advertiser will pay to maintain a given position in the ordering of the one or more advertisements for the at least one of the advertisements in the result set.

12. The system of claim 11, the processing device in response to further executable instructions, further operative to:
calculate a relevance score for each of the advertisements, the relevance score indicating a relatedness of the one or more search terms to each of the advertisements.

13. The system of claim 12, the processing device in response to further executable instructions, further operative to:
calculate a relevance confidence score that indicates a reliability of the relevance score.

14. The system of claim 13 wherein the calculating the relevance confidence score includes at least one of:
increasing the relevance confidence score for an exact match between the advertisement and the search request; and
decreasing the relevance confidence score for a broad match between the advertisement and the search request.

15. The system of claim 13 wherein the calculating the relevance confidence score is based upon an examination of an index identifying unreliable sources.

16. The system of claim 11, the processing device in response to further executable instructions, further operative to:
retrieve click through data regarding, when available, each of the advertisements comprising the result set; and
calculate a normalized click through rate for each advertisement, the normalized click through rate providing an indication of a likelihood of a user selecting a given advertisement based upon past behavior.

17. The system of 16 wherein the normalized click through rate accounts for at least one of: advertisements appearing in different places within a ranked result set, a day of the week for the placement of the advertisements and a time of day for the placement of advertisements.

18. The system of claim 16, the processing device in response to further executable instructions, further operative to:
calculate a click through rate confidence score based on the normalized click through rate for each advertisement.

19. The system of claim 18 wherein the click through rate confidence score is adjusted by at least one of the following: a quantity of data maintained by an analytics data store, a determination of whether a given advertisement has been updated or replaced with an alternative advertisement.

20. The system of claim 11 wherein the clickability score is calculated based on all of a relevance score, a relevance confidence score, a normalized click through rate and a click through rate confidence score.

* * * * *